United States Patent
Nakano et al.

(10) Patent No.: US 8,623,268 B2
(45) Date of Patent: Jan. 7, 2014

(54) PRODUCTION METHOD FOR FILAMENT NON-WOVEN FABRIC

(75) Inventors: Yohei Nakano, Otsu (JP); Yoshikazu Yakake, Otsu (JP); Ryoichi Hane, Otsu (JP)

(73) Assignee: Toray Industries, Inc. (JP)

( * ) Notice: Subject to any disclaimer, the term of this patent is extended or adjusted under 35 U.S.C. 154(b) by 210 days.

(21) Appl. No.: 13/201,894

(22) PCT Filed: Mar. 24, 2010

(86) PCT No.: PCT/JP2010/055038
§ 371 (c)(1),
(2), (4) Date: Aug. 17, 2011

(87) PCT Pub. No.: WO2010/110293
PCT Pub. Date: Sep. 30, 2010

(65) Prior Publication Data
US 2011/0298148 A1    Dec. 8, 2011

(30) Foreign Application Priority Data
Mar. 25, 2009    (JP) .................... 2009-073481

(51) Int. Cl.
*D01D 5/098*    (2006.01)
*D01F 6/76*    (2006.01)
*D04H 3/16*    (2006.01)

(52) U.S. Cl.
USPC ........ 264/555; 156/181; 264/103; 264/210.2; 264/201.8; 264/211.12; 264/211.14

(58) Field of Classification Search
USPC ......... 264/103, 210.2, 210.8, 211.12, 211.14, 264/555; 156/167, 181
See application file for complete search history.

(56) References Cited

U.S. PATENT DOCUMENTS

| 4,691,003 A * | 9/1987 | Sze ........................... 528/308.1 |
| 2010/0180558 A1* | 7/2010 | Ito et al. ......................... 55/361 |

FOREIGN PATENT DOCUMENTS

| JP | 2-182961 A | 7/1990 |
| JP | 5-209368 A | 8/1993 |
| JP | 2764911 B2 | 6/1998 |
| JP | 2890470 B2 | 5/1999 |
| JP | 2001-262436 A | 9/2001 |
| JP | 2005-154919 A | 6/2005 |
| JP | 2006-257619 A | 9/2006 |
| JP | 2008-223209 A | 9/2008 |
| WO | 2008/035775 A1 | 3/2008 |
| WO | 2008/099823 A1 | 8/2008 |
| WO | WO-2008149737 A1 * | 12/2008 |

* cited by examiner

*Primary Examiner* — Leo B Tentoni
(74) *Attorney, Agent, or Firm* — DLA Piper LLP (US)

(57) ABSTRACT

A production method for a filament non-woven fabric includes a) obtaining filaments having a crystallization temperature not exceeding 112° C. by melting a resin containing polyethylene sulfide as a main component which is not substantially copolymerized with trichlorobenzene; b) pulling and drawing fiber threads formed by discharging the melted resin from spinning nozzles at a spinning speed of at least 5,000 m/min and less than 6,000 m/min by an ejector disposed such that a distance between a bottom face of the spinning nozzles and a compressed air emission outlet of the ejector is 450-650 mm; c) collecting obtained filaments on a moving net, forming a non-woven web; and d) thermocompression bonding the obtained non-woven web using a heating roller.

2 Claims, 2 Drawing Sheets

PRODUCTION METHOD FOR FILAMENT NON-WOVEN FABRIC

RELATED APPLICATIONS

This is a §371 of International Application No. PCT/JP2010/055038, with an international filing date of Mar. 24, 2010 (WO 2010/110293 A1, published Sep. 30, 2010), which is based on Japanese Patent Application No. 2009-073481, filed Mar. 25, 2009, the subject matter of which is incorporated by reference.

TECHNICAL FIELD

This disclosure relates to a method for producing a non-woven fabric made of filaments containing polyphenylene sulfide as a main component. More specifically, the disclosure relates to a method for producing a non-woven fabric made of filaments containing polyphenylene sulfide as a main component, which does not produce irregular width shrinkage, wrinkling, or surface irregularity due to heat contraction during thermocompression bonding of a non-woven web, by a simple step.

BACKGROUND

A polyphenylene sulfide (hereinafter, sometimes abbreviated to PPS) resin is superior in characteristics such as heat resistance, chemical resistance, flame retardancy and an electric insulating property, and is suitably used as engineering plastics, films, fibers and non-woven fabrics. Particularly, the non-woven fabric made of PPS fibers is expected to be used for industrial applications such as heat-resistant filters, electric insulating materials and separators for a cell using these characteristics.

As a method for producing a non-woven fabric made of PPS fibers, a short fiber non-woven fabric made of staple fibers is proposed (refer to Japanese Patent No. 2764911). However, to obtain a non-woven fabric, it is necessary that a PPS resin is melted and spun into threads, and the threads are bound into a tow form, wet-drawn in a separate step, heat treated under tension, provided with crimping, cut into a staple, and further processed by a mechanical entangle-bonding apparatus such as a card machine or a needle punch in another step. Therefore, this method requires many steps.

A simple production method by the so-called spunbonding method, in which a PPS resin is spun and drawn by an ejector, and directly formed into a filament non-woven fabric, is proposed as a countermeasure for these problems. Specifically, a filament non-woven fabric, which is obtained by spinning a PPS resin by a spunbonding method to form a fabric, stretching the fabric at a glass transition point or higher, preferably biaxially stretching the stretched fabric, and embossing the resulting fabric, is proposed (refer to Japanese Unexamined Patent Publication No. 2005-154919). Moreover, a method for producing a filament non-woven fabric, in which a fabric obtained by spinning a PPS resin by a spunbonding method is temporarily bonded at a first crystallization temperature or lower, and then heat treated at the first crystallization temperature or higher under tension, and permanently bonded, is proposed (refer to Japanese Unexamined Patent Publication No. 2008-223209). The heat treatment under tension in JP '209 aims at promoting the crystallization of a PPS resin, which is hardly achieved only by the steps of spinning and drawing, to realize low shrinkage and dimensional stability. JP '209 shows that if the heat treatment under tension is not performed prior to the bonding or if the heat treatment under tension is insufficient, a problem of irregular width shrinkage due to heat contraction arises in this bonding step.

That is, to obtain a non-woven fabric formed by embossing a non-woven web made of a PPS resin hitherto obtained by a spunbonding method and thermobonding the resulting spunbonded web, stretching treatment under heating or heat treatment under tension is required as a preceding step of thermobonding of a non-woven web or fabric. This method has disadvantages that facilities for drawing a non-woven web or fabric under heating or heat treating a non-woven web or fabric under tension are required, which results in a complicated step with multiple stages, and that energy consumption is large, which results in cost increase, compared with a production method for preparing a spunbonded non-woven fabric using a general-purpose resin such as polyester or polypropylene, and is not necessarily a preferable method.

Further, there is also a proposal that the need for the facilities for heat treatment is eliminated by improving dimensional stability in the step of spinning a PPS resin. For example, there is a method in which dimensional stability against heat is improved by copolymerizing the PPS resin with trichlorobenzene, and spinning and drawing the resulting copolymer as an improvement means based on raw materials (refer to Japanese Patent No. 2890470). However, when the PPS resin is copolymerized with trichlorobenzene, there is a problem that stringiness is deteriorated and thread breakage during spinning and drawing occurs often, and this method lacks production stability.

Further, as an improvement means in the spinning step, a method for producing a heat-resistant non-woven fabric, in which a degree of crystallization of a fiber is improved by spinning a PPS resin at an extremely high spinning speed to suppress heat contraction, is proposed (refer to International Publication WO 2008/035775). However, in this method, since an extremely high spinning speed (7,000 to 11,000 m/min in Examples of WO '775) is employed, and due to which the amount of deformation of the fiber increases, the fiber cannot follow the deformation thereof and thread breakage tends to occur often, and since much compressed air is required, there is a problem that energy consumption is large.

As described above, the current situation is that a method for stably producing, by a simple step, a filament non-woven fabric using a PPS resin, which does not produce irregular width shrinkage, wrinkling, or surface irregularity due to heat contraction, has not been proposed.

Hence, in view of the above-mentioned problems of the prior art, it could be helpful to provide a production method which can obtain a filament non-woven fabric containing PPS as a main component, in which irregular width shrinkage, wrinkling, or surface irregularity due to heat contraction during thermocompression bonding of a non-woven web do not occur, by a simplified step in which stretching treatment under heating and/or heat treatment under tension are not performed on a non-woven web or fabric.

SUMMARY

We provide a method for producing a filament non-woven fabric including the steps of a) obtaining filaments having a crystallization temperature not exceeding 112° C. by melting a resin containing polyphenylene sulfide as a main component which is not substantially copolymerized with trichlorobenzene; b) pulling and drawing fiber threads formed by discharging the melted resin from spinning nozzles at a spinning speed of at least 5,000 m/min and less than 6,000 m/min by an ejector disposed such that a distance between a bottom face of the spinning nozzles and a compressed air emission outlet of the ejector is 450 to 650 mm; c) collecting obtained filaments on a moving net to form a non-woven web; and d) thermocompression bonding the obtained non-woven web using a heating roller.

In accordance with a preferred aspect of the method for producing a filament non-woven fabric, a step of (e) temporarily press-bonding the non-woven web by a calender roll at a temperature less than the crystallization temperature of the filament is performed between steps (c) and (d).

Since it is not necessary to perform stretching treatment under heating and/or heat treatment under tension, which have been carried out for crystallizing PPS, on a non-woven web or fabric, and it becomes possible to thermocompression bond a non-woven web obtained by a spunbonding method by a heating roller, it becomes possible to simplify the step and prepare a filament non-woven fabric which is low in cost, and superior in dimensional stability, heat resistance and chemical resistance.

DESCRIPTION OF REFERENCE SIGNS

Figure 1:
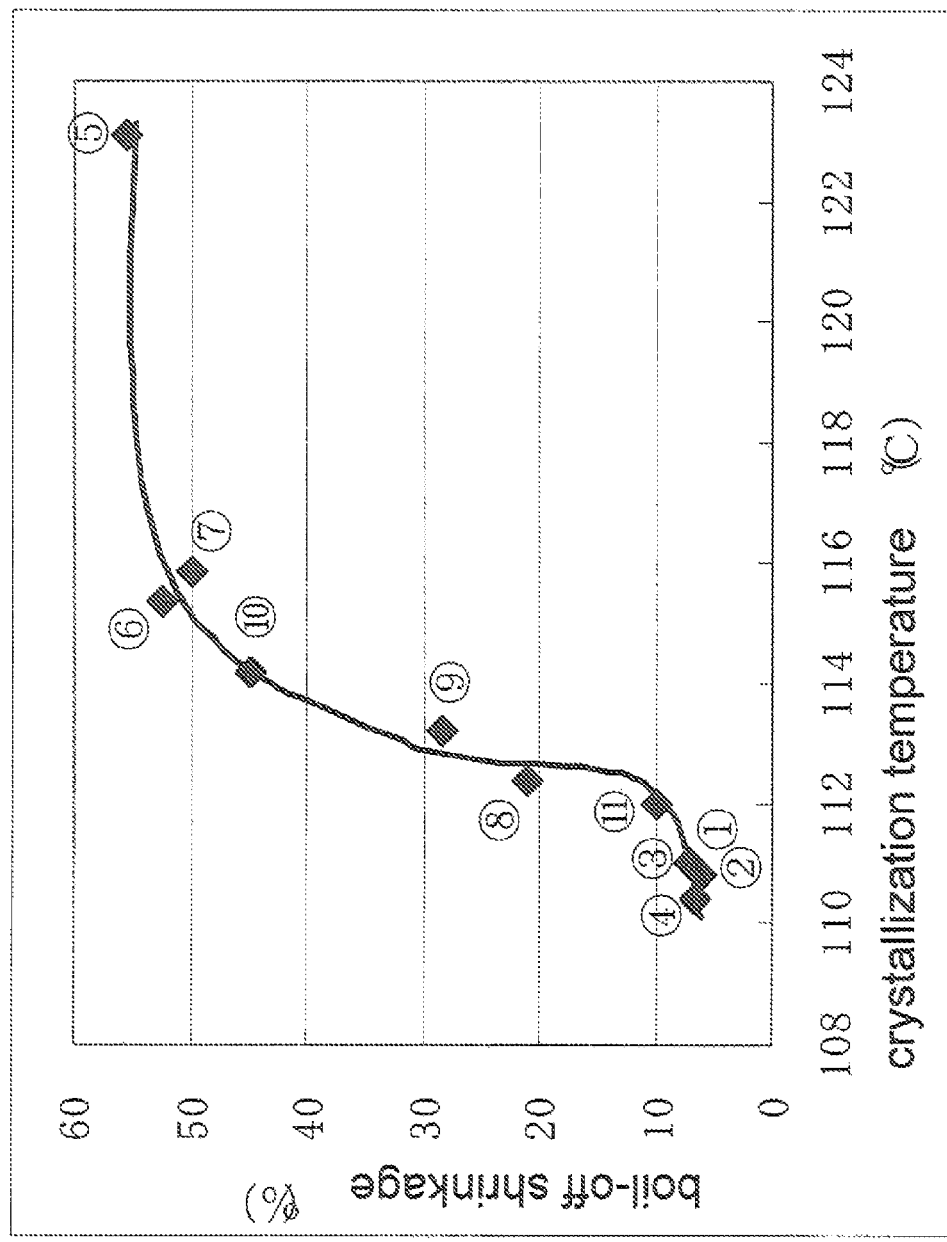
FIG. 1 is a graph showing a relationship between the crystallization temperature and the boil-off shrinkage of a PPS fiber. Data are based on Examples and Comparative Examples, and circled numbers in the graph correspond to the corresponding number shown in Table 1.

1: spinning nozzle
2: thread
3: ejector
4: compressed air
5: compressed air emission outlet
6: spinning length
7: Dn

DETAILED DESCRIPTION

Hereinafter, the method for producing a filament non-woven fabric will be described in detail.

The method for producing a filament non-woven fabric uses a production method by a spunbonding method in which a resin containing PPS as a main component is melted, fiber threads formed by discharging the melted resin from spinning nozzles are pulled and drawn by an ejector disposed immediately beneath the spinning nozzle to obtain filaments, and the filaments are collected on a moving net to form a non-woven web, and then the obtained non-woven web is thermocompression bonded using a heating roller.

The resin to form a filament non-woven fabric contains PPS as a main component. PPS has phenylene sulfide units such as a p-phenylene sulfide unit and an m-phenylene sulfide unit as repeat units. Above all, PPS containing the p-phenylene sulfide unit in an amount of 90% by mole or more has a molecular chain substantially linear, and is preferably used from the viewpoint of heat resistance and stringiness thereof.

It is preferred that PPS is not substantially copolymerized with trichlorobenzene. The reason for this is that trichlorobenzene has three halogen substituents per one molecule and provides a branched structure to a molecular chain of PPS, and therefore if PPS is copolymerized with trichlorobenzene, stringiness is deteriorated and thread breakage during spinning and drawing occurs often, making it difficult to achieve stable production. The extent, at which PPS is not substantially copolymerized, is preferably 0.05% by mole or less, and more preferably less than 0.01% by mole.

The content of PPS in the resin containing PPS as a main component (hereinafter, also referred to as a "PPS resin") is preferably 85% by mass or more, more preferably 90% by mass or more, and furthermore preferably 95% by mass or more from the viewpoint of heat resistance and chemical resistance.

Further, a crystal nucleus agent, a flatting agent, a pigment, a fungicide, an antibacterial agent, a flame retarder, and a hydrophilization agent may be added to the PPS resin to the extent that the desired effects are not impaired.

Further, in the PPS resin, a melt flow rate (hereinafter, sometimes abbreviated to an MFR) measured according to ASTM D1238-70 (measurement temperature 315.5° C., measurement load 5 kg, unit g/10 min) is preferably 100 to 300 g/10 min. A high MFR means that the fluidity of the resin is high, and therefore a PPS resin with high polymerization degree having a low MFR is preferable to attain strength or heat resistance of a fiber. However, by having an MFR of 100 g/10 min or more, more preferably 140 g/10 min or more, it is possible to suppress an increase in back pressure of a spinning nozzle, and a reduction in stringiness, that is, thread breakage. On the other hand, by having an MFR of 300 g/10 min or less, more preferably 225 g/10 min or less, a certain degree of strength or heat resistance of a fiber can be kept.

As a shape of a spinning nozzle or an ejector, various shapes such as a round shape and a rectangular shape are known, and a combination of a rectangular nozzle, from the viewpoint that fusion bonding or abrasion between threads hardly occurs, and a rectangular ejector, from the viewpoint that air usage of a high-pressure jet stream required for achieving high-speed spinning is relatively small, is preferably used.

A discharge amount of a hole, which is discharged from the spinning nozzle to achieve the above-mentioned fineness range, is preferably 0.25 to 5.90 g/min, more preferably 0.50 to 2.90 g/min, and furthermore preferably 1.00 to 2.30 g/min to obtain a fiber with the average single fiber fineness described later at the spinning speed described later.

As a shape of a cross section of the PPS fiber, any shape of a round shape, a hollow round shape, an elliptical shape, a flattened shape, irregular shapes such as a shape like a letter X or a letter Y, a polygon and a multilobar shape may be used.

It is extremely important that a fiber, which is obtained by melting a resin containing PPS as a main component, and pulling and drawing fiber threads formed by discharging the melted resin from spinning nozzles by an ejector (hereinafter, also referred to as a "PPS fiber"), has a crystallization temperature not exceeding 112° C. The definition and the measurement method of the crystallization temperature will be described later in Examples.

We found a correlation between the crystallization temperature of a PPS fiber and the boil-off shrinkage. That is, as shown by the relationship between the crystallization temperature and the boil-off shrinkage shown in FIG. 1, when the crystallization temperature is higher than 112° C., the boil-off shrinkage is as large as 30% or more, and when the crystallization temperature is 112° C. or lower, the boil-off shrinkage is rapidly decreased and is several % at a crystallization temperature of 111° C. The definition and the measurement method of the boil-off shrinkage will be described later in Examples. The boil-off shrinkage is preferably 15% or less, more preferably 10% or less, and furthermore preferably 8% or less to suppress the occurrence of the irregular width shrinkage, wrinkling, and surface irregularity due to heat contraction. Though the mechanism exhibiting the correlation shown in FIG. 1 is not clear, it is thought that a lower crystallization temperature in the PPS fiber shows that the crystallization proceeds more. Accordingly, by decreasing the crystallization temperature of the fiber to 112° C. or less, preferably 111° C. or less, even when a non-woven web made of a PPS filament is thermocompression bonded by a heating roller without performing stretching treatment and/or heat treatment under tension at a temperature of a crystallization temperature of the filament or more, a PPS filament non-woven fabric, in which the irregular width shrinkage, wrinkling and surface irregularity due to heat contraction do not occur, can be obtained.

When the crystallization temperature of the fiber is more than 112° C., if thermocompression bonding by a heating roller is performed, problems of irregular width shrinkage and wrinkling of a non-woven web due to heat contraction arise.

The lower limit of the crystallization temperature of the fiber is preferably 105° C. or more from the viewpoint of a thermocompression bonding property and the like.

Figure 2:
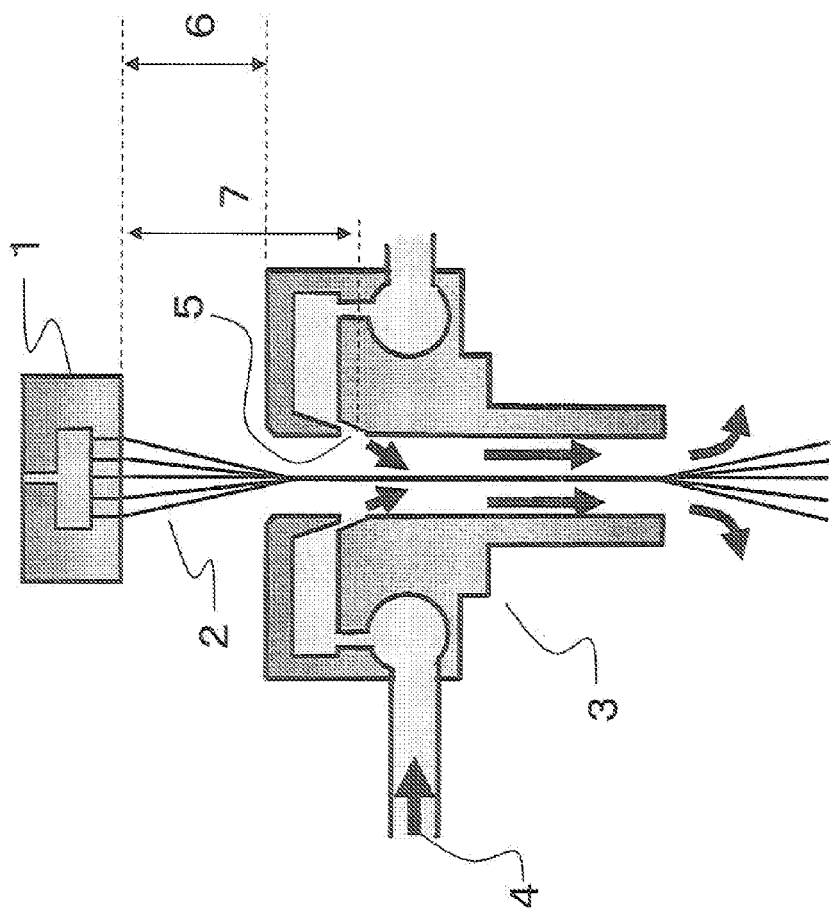
FIG. 2 is a drawing showing an example of a sectional view of the spinning section, and shows a positional relationship between a spinning length and Dn, which will be described later.

In the method for producing a filament non-woven fabric, it is important to dispose an ejector at such a position that the distance between the bottom face of the spinning nozzles and the compressed air emission outlet of the ejector (hereinafter, also referred to as "Dn," refer to FIG. 2) is 450 to 650 mm. By doing so, it is possible to prepare a PPS fiber having a crystallization temperature not exceeding 112° C. at a spinning speed of at least 5,000 m/min and less than 6,000 m/min. Though the mechanism for this is not clear, it is estimated that drawing tension can be applied to a location in a state in which solidification by cooling is not yet completed in a spinning thread, and therefore orientation and crystallization can be promoted as the fiber becomes finer. It is estimated that when the Dn is more than 650 mm, solidification by cooling is almost completed at a location where drawing tension is applied, and orientation and crystallization is hardly promoted. When the Dn is more than 650 mm, it becomes necessary to spin at a higher spinning speed of 6,000 m/min or more, which is not preferred as described later. Since there is a tendency that a shorter Dn can increase the spinning speed more at the same ejector pressure, and it is preferred in terms of economy that an ejector pressure is low, the Dn is preferably set at 600 mm or less.

On the other hand, when the Dn is less than 450 mm, cooling is insufficient and thread breakage tends to occur frequently. Further, even if the PPS resin can be spun at a spinning speed of 5,000 m/min or more, it is difficult to obtain a PPS fiber having a crystallization temperature not exceeding 112° C. Though the mechanism is not clear, it is estimated that tension is applied to a location of the fiber in a state of being melted or semi-melted, and consequently the thread becomes finer, but orientation and crystallization is hardly promoted because of excessively high fluidity of an internal structure of the fiber. In view of this, the Dn is preferably set at 500 mm or more, and more preferably at 550 mm or more.

In addition, when an ejector having a distance from an intake port to a compressed air emission outlet of 50 mm is used, since the distance between the bottom face of the spinning nozzles and the intake port of the ejector (hereinafter, referred to as a "spinning length") is shorter than the Dn by 50 mm, the spinning length is set at 400 to 600 mm, preferably 450 to 550 mm, and more preferably 500 to 550 mm, corresponding to the above-mentioned range of the Dn.

It is important that the spinning speed at which the PPS fiber is spun is 5,000 m/min or more and less than 6,000 m/min. The definition and the measurement method of the spinning speed will be described later in Examples. When the spinning speed is less than 5,000 m/min, a fiber having a crystallization temperature not exceeding 112° C. is hardly obtained. The spinning speed is preferably 5,500 m/min or more. On the other hand, a spinning speed of 6,000 m/min is practically almost at the limit for a method of pulling and drawing threads with an ejector. If the fiber is spun at a spinning speed of 6,000 m/min or more, energy consumption of high-pressure air to be supplied to the ejector becomes enormous, and further thread breakage occurs often since the fiber cannot follow the deformation thereof.

Though the spinning speed may be affected by a discharge amount of a melted resin discharged from a hole of the spinning nozzle or a cooling condition beneath the spinning nozzle, the spinning speed is generally determined by a pressure of air to be supplied to an ejector (also referred to as an "ejector pressure"), or the Dn.

The average single fiber fineness of the PPS fiber is preferably 0.5 to 10 dtex. By maintaining the average single fiber fineness at 0.5 dtex or more, the stringiness of a fiber is achieved, and the frequent occurrence of thread breakage can be suppressed. Further, by maintaining the average single fiber fineness at 10 dtex or less, the discharge amount of a melted resin per a hole of the spinning nozzle can be kept low to enable sufficient cooling, and thereby fusion bonding between fibers can be suppressed. The average single fiber fineness of the filament is more preferably 1 to 5 dtex, and furthermore preferably 2 to 4 dtex from the viewpoint of suppressing irregularity in weight per unit area of the non-woven fabric to make the surface quality better, or from the viewpoint of dust-collecting performance in the case of applying the non-woven fabric to filters.

The method for producing a filament non-woven fabric includes the step of thermocompression bonding the obtained non-woven web using a heating roller. As the form of the heating roller to be employed, a pair of upper and lower embossing rolls in which an upper roll and a lower roll, respectively having a sculpted surface, are combined, a pair of rolls in which a roll having a flat (smooth) surface and an embossing roll having a sculpted surface are combined, or a pair of rolls in which rolls having a flat (smooth) surface are combined is used.

Among these, it is preferred that after obtaining a non-woven web, temporarily press bonding the web by a calender roll, in which a pair of upper and lower rolls have a flat surface, respectively, is performed for the purpose of controlling the thickness of the obtained non-woven fabric and uniformizing variations in thickness in a width direction prior to thermocompression bonding by the heating roller, and then thermocompression bonding by a heating roller, preferably an embossing roll, is performed. As the calender roll, a calender roll of a combination of upper and lower metallic rolls, or a calender roll of a combination of a metallic roll and a resin roll can be used.

The temperature at which the temporary press bonding is performed by a calender roll may be lower than the temperature at which the thermocompression bonding is performed thereafter, but the temperature is preferably the crystallization temperature of the fiber or lower to avoid promotion of the crystallization of the PPS fiber excessively to effectively perform the control of the thickness of a non-woven fabric or the thermocompression bonding by a heating roller. On the other hand, the temperature of temporary press bonding is preferably 80° C. or higher to achieve the ability of a non-woven web to be carried by adequate control of the thickness and adequate temporary press bonding.

The linear pressure of the calender roll during temporary press bonding is preferably 50 to 700 N/cm, and more preferably 150 to 400 N/cm. By setting the linear pressure at 50 N/cm or more, adequate temporary press bonding can be performed to achieve the ability of a sheet to be carried. On the other hand, by setting the linear pressure at 700 N/cm or less, it is possible to prevent the thickness from becoming excessively small like paper, and to prevent characteristics of a non-woven fabric from being impaired, for example, lack of air permeability.

The temperature at which the thermocompression bonding is performed by a heating roller is preferably in a range of 260 to 282° C. By setting the temperature of the thermocompression bonding at 260° C. or higher, more preferably 265° C. or higher, inadequate thermocompression bonding can be prevented, and peeling or fuzz of a sheet can be suppressed. On the other hand, by setting the temperature of the thermocompression bonding at 282° C. or lower, more preferably 280° C. or lower, it is possible to prevent the fusion of the fiber from occurring to cause the perforation of a press-bonding part.

Further, a press-bond area ratio at the time when an embossing roll is used for thermocompression bonding is preferably 8 to 40%. By setting the press-bonding area ratio at 8% or more, more preferably 10% or more, and furthermore preferably 12% or more, it is possible to achieve strength which is adequate for practical use. Further, by setting the press-bonding area ratio at 40% or less, more preferably 30% or less, and furthermore preferably 20% or less, it is possible to prevent the non-woven fabric from becoming a film-like product on the whole, and prevent characteristics of a non-woven fabric such as air permeability from being hardly achieved.

EXAMPLES

Hereinafter, the method for producing a filament non-woven fabric will be specifically described by way of examples, but the disclosure is not intended to be limited to these examples. Characteristics in the examples were measured by the following methods.

(1) Melt Flow Rate (MFR) (g/10 min)

The MFR of PPS was measured under the conditions of measurement temperature of 315.5° C. and measurement load of 5 kg according to ASTM D1238-70.

(2) Average Single Fiber Fineness (dtex)

After pulling and drawing fiber threads by an ejector, ten small pieces of sample were taken from the non-woven web collected on the net on a random basis, surface photographs at magnifications of 500 to 1000 times were taken with a microscope, and 10 fibers per each sample, 100 fibers in total, were selected and their fiber widths were measured to calculate an average. An average width of the single fibers was considered as an average diameter of fibers having a round cross-section, and from the average diameter and a solid density of the used resin, a weight per 10,000 m of a single fiber was calculated and rounded off below first place of decimals to determine an average single fiber fineness.

(3) Spinning Speed (m/min)

From the average single fiber fineness (dtex) of fibers and the discharge amount, determined according to the conditions, of a resin discharged from a hole of the spinning nozzle (hereinafter, referred to as a discharge amount of a hole) (g/min), the spinning speed was calculated based on the following equation:

$$\text{Spinning speed} = (10000 \times \text{discharge amount of a hole}) / \text{Average single fiber fineness}.$$

(4) Crystallization Temperature (° C.)

Three samples were taken from a filament obtained by pulling and drawing by an ejector, and 5 mg of sample was subjected to differential scanning calorimetry (DSC 6200 manufactured by Seiko Instruments Inc.) and the temperature of the sample was raised at 10° C./min from 30° C. to 340° C. The temperature at an apex of a crystallization peak (exothermic peak) in the resulting differential scanning calorimetry curve was measured, and an average of three samples was taken as a crystallization temperature. When there are a plurality of crystallization peaks, the temperature at the peak apex on a side of the highest temperature was employed.

(5) Boil-Off Shrinkage (%)

Filaments passed through an ejector were taken, and five filaments were aligned into one sample (the length was about 10 cm). A load described below was applied to this sample and its length $L_0$ was measured, and then the sample was immersed in boiling water for 20 minutes under no tension, taken out from boiling water, dried naturally, and thereafter its length $L_1$ was measured again with the same load applied. From $L_0$ and $L_1$, the boil-off shrinkage was calculated to determine an average of four samples. Calculation equations of the load and the boil-off shrinkage are shown below. The load was rounded off below second place of decimals.

$$\text{Load}(g) = 0.9 \times (\text{discharge amount of a hole})(g/\text{min})$$

$$\text{Boil-off shrinkage}(\%) = \{(L_0 - L_1)/L_0\} \times 100$$

(6) Weight Per Unit Area of Non-Woven Fabric (g/m²)

The weight per unit area was measured according to JIS L 1906 (2000), paragraph 5.2 mass per unit area.

(7) Tensile Strength of Non-Woven Fabric (N/5 Cm)

The tensile strength was measured according to JIS L 1906 (2000), paragraph 5.3 tensile strength and elongation (standard).

(8) Heat Contraction of Non-Woven Fabric (%)

The heat contraction was measured according to JIS L 1906 (2000), paragraph 5.9 heat contraction. The temperature in an isothermal drying machine was set at 200° C., and a sample was heat treated for 10 minutes.

Example 1

A linear polyphenylene sulfide resin (manufactured by TORAY INDUSTRIES, INC., product number: E2280) with an MFR of 160 g/10 min, which is not copolymerized with trichlorobenzene by design, was dried at a temperature of 160° C. for 10 hours in a nitrogen atmosphere. The resin was melted in an extruder, the melted resin was spun out from a rectangular spinning nozzle having a hole of ϕ0.30 mm in diameter at a discharge amount from a hole of 1.38 g/min at a spinning temperature of 325° C., and threads discharged in an atmosphere of a room temperature of 20° C. were pulled and drawn at an ejector pressure of 0.25 MPa by a rectangular ejector disposed at a position 550 mm (a spinning length 550 mm) from immediately beneath the spinning nozzle, in which the distance from an intake port to a compressed air emission outlet of the ejector is 50 mm (the distance (Dn) between the bottom face of the spinning nozzles and the compressed air emission outlet of the ejector is 600 mm), and collected on a moving net to form a non-woven web. A spinning property was good, and an average single fiber fineness of the obtained filaments was 2.4 dtex, a converted spinning speed was 5,726 m/min, a crystallization temperature of the fiber was 110.9° C., and a boil-off shrinkage was 6.7%.

Subsequently, the obtained non-woven web was temporarily press-bonded at a temporary bonding temperature of 90° C. at a linear pressure of 200 N/cm by a pair of upper and lower metallic calender rolls located on an in-line, and then thermocompression bonded at a thermocompression bonding temperature of 275° C. at a linear pressure of 1,000 N/cm by a pair of upper and lower embossing rolls in which an upper roll is composed of a metallic embossing roll which is sculpted into a polka-dot pattern and has a press-bonding area ratio of 12%, and a lower roll is composed of a metallic flat roll to obtain a filament non-woven fabric having a weight per unit area of 201 g/m². The obtained filament non-woven fabric was a non-woven fabric of good quality which did not produce large irregular width shrinkage, and wrinkling and surface irregularity due to heat contraction during thermocompression bonding of the filament non-woven web by the embossing roll. Further, the obtained filament non-woven fabric had a tensile strength in a machine direction of 305 N/5 cm and heat contractions of 0% in a machine direction and −0.4% in a crosswise direction.

Example 2

A filament non-woven fabric was prepared in the same manner as in Example 1 except for disposing the ejector at a position 450 mm (a spinning length 450 mm, Dn 500 mm) from immediately beneath the spinning nozzle. A spinning property was good as with Example 1. An average single fiber fineness of the obtained filaments was 2.3 dtex, a converted spinning speed was 5,897 m/min, a crystallization temperature of the fiber was 110.8° C., and a boil-off shrinkage was 6.0%. Further, the obtained filament non-woven fabric was a non-woven fabric of good quality which did not produce large irregular width shrinkage, and wrinkling and surface irregularity due to heat contraction during thermocompression bonding of the filament non-woven web by the embossing roll. Further, the obtained filament non-woven fabric had a weight per unit area of 201 g/m², a tensile strength in a machine direction of 306 N/5 cm and heat contractions of −0.1% in a machine direction and −0.2% in a crosswise direction.

Example 3

A filament non-woven fabric was prepared in the same manner as in Example 1 except for changing an amount of a resin discharged from a hole to 0.83 g/min. Though there was a tendency of causing thread breakage a little in spinning compared with Example 1, there was no problem in the level of thread breakage. An average single fiber fineness of the obtained filaments was 1.6 dtex, a converted spinning speed was 5,188 m/min, a crystallization temperature of the fiber was 111.0° C., and a boil-off shrinkage was 7.0%. Further, the obtained filament non-woven fabric was a non-woven fabric of good quality which did not produce large irregular width shrinkage, and wrinkling and surface irregularity due to heat contraction during thermocompression bonding of the filament non-woven web by the embossing roll. Further, the obtained filament non-woven fabric had a weight per unit area of 202 g/m², a tensile strength in a machine direction of 310 N/5 cm, and heat contractions of −0.1% in a machine direction and 0% in a crosswise direction.

Example 4

A filament non-woven fabric was prepared in the same manner as in Example 1 except that an amount of a resin discharged from a hole was changed to 0.83 g/min and the ejector was disposed at a position 450 mm (a spinning length 450 mm, Dn 500 mm) from immediately beneath the spinning nozzle. Though there was a tendency of causing thread breakage a little in spinning compared with Example 1, there was no problem in the level of thread breakage. An average single fiber fineness of the obtained filaments was 1.5 dtex, a converted spinning speed was 5,497 m/min, a crystallization temperature of the fiber was 110.4° C., and a boil-off shrinkage was 6.7%. Further, the obtained filament non-woven fabric was a non-woven fabric of good quality which did not produce large irregular width shrinkage, and wrinkling and surface irregularity due to heat contraction during thermocompression bonding of the filament non-woven web by the embossing roll. Further, the obtained filament non-woven fabric had a weight per unit area of 200 g/m2, a tensile strength in a machine direction of 312 N/5 cm, and heat contractions of 0% in a machine direction and −0.1% in a crosswise direction.

Comparative Example 1

A filament non-woven fabric was prepared in the same manner as in Example 1 except for changing the ejector pressure to 0.05 MPa. An average single fiber fineness of the obtained filaments was 5.6 dtex, a converted spinning speed was 2,482 m/min, a crystallization temperature of the fiber was 123.1° C., and a boil-off shrinkage was 55.4%. The obtained filament non-woven fabric produced large irregular width shrinkage and wrinkling due to heat contraction during thermocompression bonding of the filament non-woven web by the embossing roll, and a filament non-woven fabric of good quality was not obtained. Particularly, the irregular width shrinkage of the filament non-woven fabric of this comparative example was significantly large (significant shrinkage and solidification) compared with Comparative Example 2 described later, and therefore the filament non-woven fabric could not be subjected to embossing.

Comparative Example 2

A filament non-woven fabric was prepared in the same manner as in Example 1 except for changing the ejector pressure to 0.15 MPa. An average single fiber fineness of the obtained filaments was 3.2 dtex, a converted spinning speed was 4,299 m/min, a crystallization temperature of the fiber was 115.4° C., and a boil-off shrinkage was 52.3%. The obtained filament non-woven fabric produced large irregular width shrinkage and wrinkling due to heat contraction during thermocompression bonding of the filament non-woven web by the embossing roll, and a filament non-woven fabric of good quality was not obtained.

Comparative Example 3

A filament non-woven fabric was prepared in the same manner as in Example 1 except that the ejector was disposed at a position 350 mm (a spinning length 350 mm, Dn 400 mm) from immediately beneath the spinning nozzle and the ejector pressure was changed to 0.20 MPa. Sporadic thread breakages were found due to the lack of cooling with respect to a spinning property compared with Example 1. An average single fiber fineness of the obtained filaments was 2.5 dtex, a converted spinning speed was 5,498 m/min, a crystallization temperature of the fiber was 115.9° C., and a boil-off shrinkage was 50.0%. The obtained filament non-woven fabric produced large irregular width shrinkage of a non-woven web and wrinkling due to heat contraction during thermocompression bonding of the filament non-woven web by the embossing roll, and a filament non-woven fabric of good quality was not obtained.

Comparative Example 4

A filament non-woven fabric was prepared in the same manner as in Example 1 except for disposing the ejector at a position 350 mm (a spinning length 350 mm, Dn 400 mm) from immediately beneath the spinning nozzle. Thread breakages were often found due to the lack of cooling with respect to a spinning property and the filament non-woven fabric was defective. An average single fiber fineness of the obtained filaments was 2.2 dtex, a converted spinning speed was 6,415 m/min, a crystallization temperature of the fiber was 112.4° C., and a boil-off shrinkage was 21.0%. The obtained filament non-woven fabric produced wrinkling because of irregular width shrinkage of a non-woven web due to heat contraction during thermocompression bonding of the filament non-woven web by the embossing roll, and a filament non-woven fabric of good quality was not obtained.

Comparative Example 5

A filament non-woven fabric was prepared in the same manner as in Example 1 except for disposing the ejector at a position 650 mm (a spinning length 650 mm, Dn 700 mm) from immediately beneath the spinning nozzle. A spinning property was good, and an average single fiber fineness of the obtained filaments was 2.5 dtex, a converted spinning speed was 5,564 m/min, a crystallization temperature of the fiber was 113.2° C., and a boil-off shrinkage was 28.4%. The obtained filament non-woven fabric produced large irregular width shrinkage of a non-woven web and wrinkling due to heat contraction during thermocompression bonding of the filament non-woven web by the embossing roll, and a filament non-woven fabric of good quality was not obtained.

Comparative Example 6

A filament non-woven fabric was prepared in the same manner as in Example 1 except for disposing the ejector at a position 750 mm (a spinning length 750 mm, Dn 800 mm) from immediately beneath the spinning nozzle. A spinning property was good, and an average single fiber fineness of the obtained filaments was 2.6 dtex, a converted spinning speed was 5,408 m/min, a crystallization temperature of the fiber was 114.2° C., and a boil-off shrinkage was 44.7%. The obtained filament non-woven fabric produced large irregular width shrinkage of a non-woven web and wrinkling due to heat contraction during thermocompression bonding of the filament non-woven web by the embossing roll, and a filament non-woven fabric of good quality was not obtained.

Comparative Example 7

Spinning was performed in the same manner as in Example 1 except that a polyphenylene sulfide resin (manufactured by TORAY INDUSTRIES, INC., product number: T1881) with an MFR of 70 g/10 min, which is copolymerized with trichlorobenzene in an amount of 0.06 mol %, was used, an amount of a resin discharged from a hole was changed to 0.83 g/min and the ejector pressure was changed to 0.20 MPa. However, thread breakage occurred significantly during spinning and the formation of a non-woven web was abandoned. An average single fiber fineness of the filaments was 1.8 dtex, a converted spinning speed was 4,511 m/min, a crystallization temperature of the fiber was 112.0° C., and a boil-off shrinkage was 10.0%.

Reference Example 1

In Example 1, the fiber threads discharged from spinning nozzles were let fall freely without being pulled and drawn by an ejector and solidified to form fibers, and a sample was taken from the fibers and measured on a crystallization temperature. Consequently, the crystallization temperature was 135.2° C.

The results of Examples 1 to 4 are shown in Table 1, and the results of Comparative Examples 1 to 7 and Reference Example 1 are shown in Table 2.

TABLE 1

| | | | Example 1 | Example 2 | Example 3 | Example 4 |
|---|---|---|---|---|---|---|
| Resin | MFR | g/10 min | 160 | 160 | 160 | 160 |
| | Trichlorobenzene | mol % | — | — | — | — |
| Spinning | Discharge amount from a hole of nozzle | g/min | 1.38 | 1.38 | 0.83 | 0.83 |
| | Spinning length | mm | 600 | 500 | 600 | 500 |
| | Ejector pressure | MPa | 0.25 | 0.25 | 0.25 | 0.25 |
| | Average single fiber fineness | dtex | 2.4 | 2.3 | 1.6 | 1.5 |
| | Spinning speed | m/min | 5726 | 5897 | 5188 | 5497 |
| | Crystallization temperature of fiber | ° C. | 110.9 | 110.8 | 111.0 | 110.4 |
| | Boil-off shrinkage | % | 6.7 | 6.0 | 7.0 | 6.7 |
| | Corresponding number in FIG. 1 | | (1) | (2) | (3) | (4) |
| Temporary press-bonding by calender roll | Temperature | ° C. | 90 | 90 | 90 | 90 |
| | Linear pressure | N/cm | 200 | 200 | 200 | 200 |
| Thermocompression bonding by embossing roll | Temperature | ° C. | 275 | 275 | 275 | 275 |
| | Linear pressure | N/cm | 1000 | 1000 | 1000 | 1000 |
| Non-woven fabric | Weight per unit area | g/m² | 201 | 201 | 202 | 200 |
| | Tensile strength (machine direction) | N/5 cm | 305 | 306 | 310 | 312 |
| | Heat contraction  machine direction | % | 0 | −0.1 | −0.1 | 0 |
| | crosswise direction | % | −0.4 | −0.2 | 0 | −0.1 |

TABLE 2

|  |  |  | Comparative Example 1 | Comparative Example 2 | Comparative Example 3 | Comparative Example 4 | Comparative Example 5 | Comparative Example 6 | Comparative Example 7 | Reference Example 1 |
|---|---|---|---|---|---|---|---|---|---|---|
| Resin | MFR | g/10 min | 160 | 160 | 160 | 160 | 160 | 160 | 70 | 160 |
|  | Trichlorobenzene | mol % | — | — | — | — | — | — | 0.06 | — |
| Spinning | Discharge amount from a hole of nozzle | g/min | 1.38 | 1.38 | 1.38 | 1.38 | 1.38 | 1.38 | 0.83 | 1.38 |
|  | Spinning length | mm | 600 | 600 | 400 | 400 | 700 | 800 | 600 | — |
|  | Ejector pressure | MPa | 0.05 | 0.15 | 0.20 | 0.25 | 0.25 | 0.25 | 0.20 | — |
|  | Average single fiber fineness | dtex | 5.6 | 3.2 | 2.5 | 2.2 | 2.5 | 2.6 | 1.8 | — |
|  | Spinning speed | m/min | 2482 | 4299 | 5498 | 6415 | 5564 | 5408 | 4511 | — |
|  | Crystallization temperature of fiber | °C. | 123.1 | 115.4 | 115.9 | 112.4 | 113.2 | 114.2 | 112.0 | 135.2 |
|  | Boil-off shrinkage | % | 55.4 | 52.3 | 50.0 | 21.0 | 28.4 | 44.7 | 10.0 | — |
|  | Corresponding number in FIG. 1 |  | (5) | (6) | (7) | (8) | (9) | (10) | (11) | (12) |
| Temporary press-bonding by calender roll | Temperature | °C. | 90 | 90 | 90 | 90 | 90 | 90 | — | — |
|  | Linear pressure | N/cm | 200 | 200 | 200 | 200 | 200 | 200 | — | — |
| Thermocompression bonding by embossing roll | Temperature | °C. | 275 | 275 | 275 | 275 | 275 | 275 | — | — |
|  | Linear pressure | N/cm | 1000 | 1000 | 1000 | 1000 | 1000 | 1000 | — | — |

In Examples 1 to 4 in which the crystallization temperature of the filament was 112° C. or less, even when stretching treatment and/or heat treatment under tension at a temperature of a crystallization temperature of the filament or more was not performed on the obtained non-woven web, thermocompression bonding by an embossing roll can be performed, and a filament non-woven fabric of good quality, which is free from wrinkling and surface irregularity, was obtained. Further, the obtained filament non-woven fabric produced little heat contraction at 200° C. and was excellent in dimensional stability.

On the other hand, in Comparative Examples 1 to 6 in which the crystallization temperature of a filament was higher than 112° C., any non-woven web produced large irregular width shrinkage of a non-woven web and wrinkling due to heat contraction during thermocompression bonding by the embossing roll, and a filament non-woven fabric of good quality was not obtained.

In Comparative Example 7 using the PPS resin copolymerized with trichlorobenzene, a crystallization temperature of the fiber can be made 112° C. or less, but since thread breakage occurred significantly during spinning, a non-woven fabric of good quality was not obtained.

Industrial Applicability

Since the obtained filament non-woven fabric is superior in dimensional stability, heat resistance, flame retardancy, chemical resistance, the filament non-woven fabric can be suitably used for various industrial filters, electrical insulating materials, separators for a cell, membrane base materials for water treatment, heat insulation base materials, and protective clothing.

The invention claimed is:

1. A method for producing a filament non-woven fabric, comprising the steps of:
    a) obtaining filaments having a crystallization temperature not exceeding 112° C. by melting a resin containing polyphenylene sulfide as a main component which is not substantially copolymerized with trichlorobenzene;
    b) pulling and drawing fiber threads formed by discharging the melted resin from spinning nozzles at a spinning speed of at least 5,000 m/min and less than 6,000 m/min by an ejector disposed such that a distance between a bottom face of the spinning nozzles and a compressed air emission outlet of the ejector is 450 to 650 mm;
    c) collecting obtained filaments on a moving net to form a non-woven web; and
    d) thermocompression bonding the obtained non-woven web using a heating roller.

2. The method according to claim 1, wherein a step of (e) temporarily press-bonding the non-woven web by a calender roll at a temperature less than the crystallization temperature of the filament is performed between steps (c) and (d).

* * * * *